Patented July 17, 1934

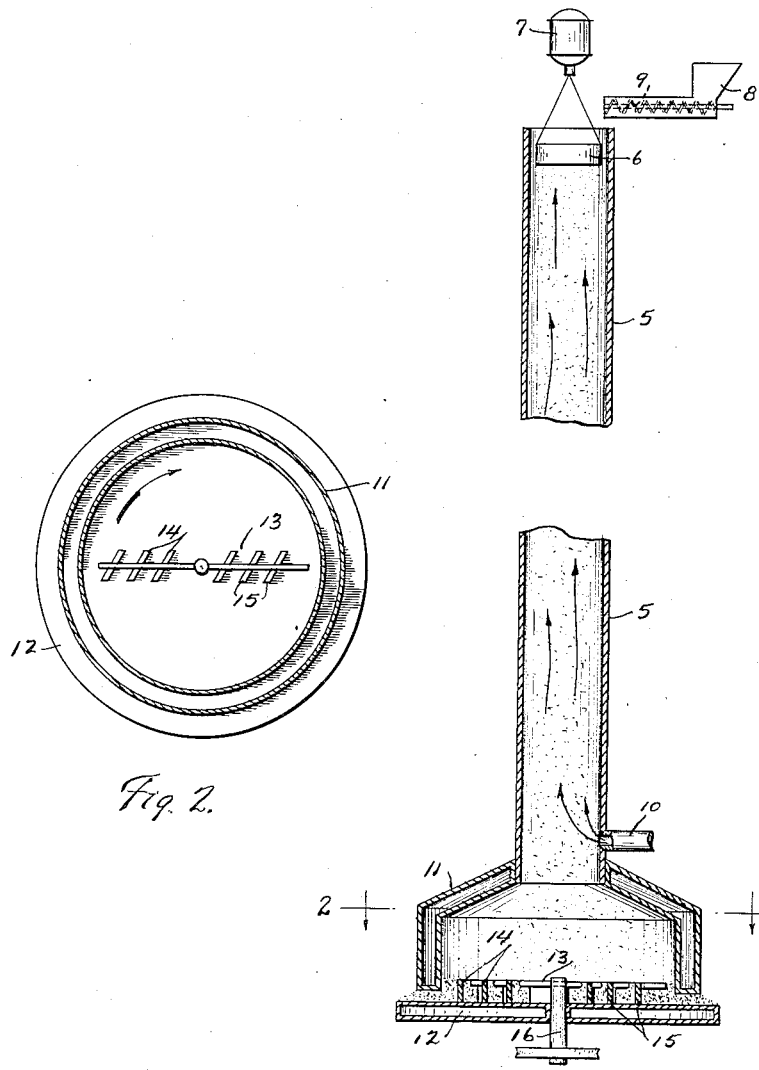

1,966,631

UNITED STATES PATENT OFFICE 1,966,631

METHOD OF MAKING BLEACHING POWDER

Edward Thorndike Ladd, Lewiston, N. Y., assignor to Isco Chemical Company, Inc., Niagara Falls, N. Y., a corporation of New York Original application October 26, 1929, Serial No. 402,614, now Patent No. 1,904,478. Divided and this application May 19, 1932, Serial No. 612,255

4 Claims. (Cl. 23—86)

My invention relates in general to a method of continuously making bleaching powder commonly known as chloride of lime, and this application is a division of an application filed by me on October 26, 1929, bearing Serial No. 402,614 now Patent No. 1,904,478, issued April 18, 1933.

It is well known to those skilled in the art that in the making of a chlorinated product, particularly when the chlorination is as high as 35%, an accummulation of the finished product for any length of time within the treating chamber and in the presence of the chlorine gas will cause some of the gas to be entrapped within the product with the result that its character will be detrimentally changed to a degree depending upon the length of time such accumulation is held in the presence of the gas. A product of much inferior quality will thus result and when the product is packed in this condition, continued chemical action renders the same worthless.

The general objects of my invention have been to provide a method whereby the above disadvantages shall be overcome.

Another object of my invention has been to provide a process by which bleaching powder may be continuously made and collected by chlorinating lime hydrate while freely falling in a finely divided state through a chlorinated atmosphere.

Another object has been to provide a method whereby a desirable commercial bleaching powder may be continuously produced in marketable quantities.

Another object has been to provide a method in which the finished product may be continuously discharged.

Moreover, in my method, the chlorination is partially completed during the vertical fall of the finely divided lime and is then completed by being tumbled as it is being moved toward the discharge opening in a horizontal plane.

Furthermore, in my method, the finished bleaching powder provides a seal at the bottom of the device which prevents the escape of the chlorine gas, as well as allowing the immediate and continuous discharge of the product when it has reached the desired degree of chlorination.

In the drawing, I have shown one form of device for carrying out my method, it being obvious other apparatus may be used with equal efficiency.

Fig. 1 is a vertical, sectional elevation of the device.

Fig. 2 is a plan view, taken on line 2—2 of Fig. 1.

The device shown in the accompanying drawing comprises a chlorinating tower 5, preferably cylindrical in shape and of a height considerably greater than its diameter, at the upper end of which may be arranged a screen 6, which is driven by means of a motor 7. A feed hopper 8 provided with a screw conveyor 9 may be arranged over the top of the tower for the purpose of feeding lime hydrate into the screen 6. By means of the screen the lime hydrate is caused to freely fall down through the tower in a steady shower of well distributed particles.

Arranged at any suitable point in the tower is an inlet 10 for chlorine gas by which an atmosphere of chlorine is maintained within the tower, through which the particles of lime fall, thus exposing the lime hydrate to the gas which it absorbs.

Arranged at the bottom of the tower is a hood 11, preferably cylindrical in shape and designed to be water cooled. This hood may be in interspaced relation with the floor 12, which is also water cooled. Suitable connections (not shown) are, of course, provided for circulating cooling water through the hood 11 and the floor 12, whereby a certain amount of heat of combination may be dissipated. The hood and floor are considerably larger in diameter than the tower so that as the partially finished product is fed outwardly over the floor and through the discharge opening, it will be further exposed to the chlorinating atmosphere.

Arranged on top of the floor 12 is a plow 13 which has a plurality of paddles 14 and 15, arranged preferably in angular relation as shown in Fig. 2. The paddles on each side of the shaft 16 to which the plow is attached are staggered so that the partially finished product will be repeatedly tumbled during its travel across the floor. The shaft 16 passes up through the floor 12 and is rotated by any suitable means (not shown).

The plow 13 is continuously rotating during the operation of the apparatus, and the partially chlorinated bleaching powder which has fallen on top of the floor 12 is moved outwardly into and accumulates in the discharge space between the top of the floor 12 and the bottom edge of the hood 11 until it forms a complete seal against leakage of the chlorine gas. In its horizontal movement toward the discharge opening, the product which has been partially chlorinated during its vertical, unobstructed fall through the chamber becomes completely chlorinated. After the seal has been formed, continued horizontal movement of the partly finished chlorinated product which is deposited upon the floor will cause a continuous discharge of the finished product out through the space between the hood and the floor, and at the same time maintaining a seal. By thus continuously discharging the finished product immediately after chlorination has been completed, detrimental entrapping of chlorine gas is obviated. Obviously, the finished product is collected by any suitable and well known means.

It is well known to those skilled in the art that a good commercial bleaching powder is chlorinated between 35% and 38%, and wherever in this description or in the appended claims I refer to the finished chlorinated product, I mean a product of substantially this degree of chlorination.

Wherever in the appended claims the term "tower" is used, it is to be understood that it refers to the tower 5 which is so constructed that the particles of lime hydrate may freely fall within it and not be obstructed in such descent until they reach the bottom of the tower, after passing vertically through the chlorinated atmosphere. In my method the lime hydrate, as it is being chlorinated and discharged as finished product, is constantly in motion either vertically or horizontally, whereby the finished product is in proper condition for immediate packing.

Having thus described my invention, what I claim is:

1. A method of making bleaching powder, comprising the creation and maintenance of a chlorinated atmosphere within a relatively high vertical chamber free of obstructions, sprinkling well distributed particles of lime hydrate within the chamber, then uninterruptedly passing such particles of lime through the chamber a distance sufficient to properly chlorinate them, and immediately discharging the finished product from the chamber in continuous manner at the time the desired chlorination is completed.

2. A method of making bleaching powder, comprising the creation and maintenance of a chlorinated atmosphere within a relatively high vertical chamber free of obstructions, then uninterruptedly subjecting such particles of lime to the chlorinated atmosphere by allowing them to fall vertically through the chamber, then completing the desired chlorination of the particles by tumbling and moving them in a horizontal direction across the bottom of the chamber, and then immediately discharging them from the chamber in continuous manner.

3. A method of making bleaching powder, comprising the creation and maintenance of a chlorinated atmosphere within a relatively high chlorinating tower, continuously causing well distributed particles of lime hydrate to freely fall into and through the tower, subjecting such particles of lime hydrate to the chlorinated atmosphere within the tower, completing the desired chlorination by collecting and continuously tumbling the partly finished product at the bottom of the tower, creating a seal at the bottom of the tower by means of the moving layer of finished chlorinated product and immediately discharging such product through such seal in continuous manner.

4. A method of making bleaching powder, comprising the creation and maintenance of a chlorinated atmosphere within a relatively high vertical chamber free of obstructions, sprinkling well distributed particles of lime hydrate within the chamber, then uninterruptedly subjecting such particles of lime to the chlorinated atmosphere by allowing them to fall vertically through the chamber, removing the heat of reaction before the product is discharged, then completing the chlorination by continuously moving the particles of lime horizontally across the bottom of the chamber, and immediately discharging the finished product from the chamber in continuous manner at the time the desired chlorination is completed.

EDWARD THORNDIKE LADD.